United States Patent
Jansen

(10) Patent No.: US 11,226,347 B2
(45) Date of Patent: Jan. 18, 2022

(54) METHOD FOR SIMULTANEOUSLY AND AUTOMATICALLY ANALYZING MICROORGANISMS IN A SAMPLE USING FILTER CYTOMETRY

(75) Inventor: Gijsbert Johan Jansen, Giekerk (NL)

(73) Assignee: Biotrack Holding B.V., Sneek (NL)

( * ) Notice: Subject to any disclaimer, the term of this patent is extended or adjusted under 35 U.S.C. 154(b) by 374 days.

(21) Appl. No.: 13/122,938

(22) PCT Filed: Oct. 7, 2008

(86) PCT No.: PCT/EP2008/008541
§ 371 (c)(1),
(2), (4) Date: Jun. 27, 2011

(87) PCT Pub. No.: WO2010/040371
PCT Pub. Date: Apr. 15, 2010

(65) Prior Publication Data
US 2011/0250633 A1 Oct. 13, 2011

(51) Int. Cl.
| C12Q 1/06 | (2006.01) |
| C12M 1/00 | (2006.01) |
| G01N 35/02 | (2006.01) |
| G06K 9/00 | (2006.01) |
| G01N 1/31 | (2006.01) |
| G01N 15/06 | (2006.01) |

(52) U.S. Cl.
CPC ........... *G01N 35/025* (2013.01); *G01N 1/312* (2013.01); *G01N 15/0643* (2013.01); *G06K 9/00134* (2013.01); *G01N 2223/313* (2013.01)

(58) Field of Classification Search
CPC ................. G01N 15/0643; G06K 9/00134
USPC ......................................................... 435/39
See application file for complete search history.

(56) References Cited

U.S. PATENT DOCUMENTS

| 4,432,674 A | 2/1984 | Klose et al. |
| 5,219,525 A | 6/1993 | Harrison |
| 5,349,844 A | 9/1994 | Lilienfeld |
| 5,512,137 A | 4/1996 | Shimizu et al. |
| 5,790,692 A | 8/1998 | Price et al. |
| 5,821,066 A | 10/1998 | Pyle et al. |
| 6,057,150 A | 5/2000 | Lee et al. |
| 7,190,832 B2 | 3/2007 | Frost et al. |
| 2003/0092170 A1 | 5/2003 | Pressman et al. |
| 2004/0265177 A1 | 12/2004 | Nicoli et al. |
| 2006/0021934 A1 | 2/2006 | Cho et al. |
| 2006/0024756 A1 | 2/2006 | Tibbe et al. |

FOREIGN PATENT DOCUMENTS

| DE | 4109191 | 9/1992 |
| EP | 0589295 | 3/1994 |
| EP | 0974827 | 1/2000 |
| EP | 1760634 | 3/2007 |
| EP | 1826276 | 8/2007 |
| EP | 1826548 | 8/2007 |
| GB | 1124098 | 8/1968 |
| GB | 2251068 | 6/1992 |
| WO | 2000049391 | 8/2000 |
| WO | 2001046382 | 6/2001 |
| WO | 2003071395 | 8/2003 |
| WO | 2004004868 | 1/2004 |
| WO | 2007096128 | 8/2007 |

OTHER PUBLICATIONS

Selunummi, 2005, BioTechniques, 39, 859-863.*

* cited by examiner

*Primary Examiner* — Nghi V Nguyen
(74) *Attorney, Agent, or Firm* — Marcus C. Dawes; Daniel L. Dawes

(57) ABSTRACT

Device for automatically analyzing micro organisms in an aqueous sample using filter cytometry comprising at least one filter holder and processing modules, wherein the filter holder is arranged to contain a filter for receiving the sample, wherein the processing modules comprise sample application means for applying the sample to the filter in the holder and imaging means for imaging the micro organisms on the filter, wherein the device furthermore comprises displacement means for automatically moving the filter holder between the processing modules and wherein each of the modules and the filter holder are arranged to removable connect for interaction.

10 Claims, 3 Drawing Sheets

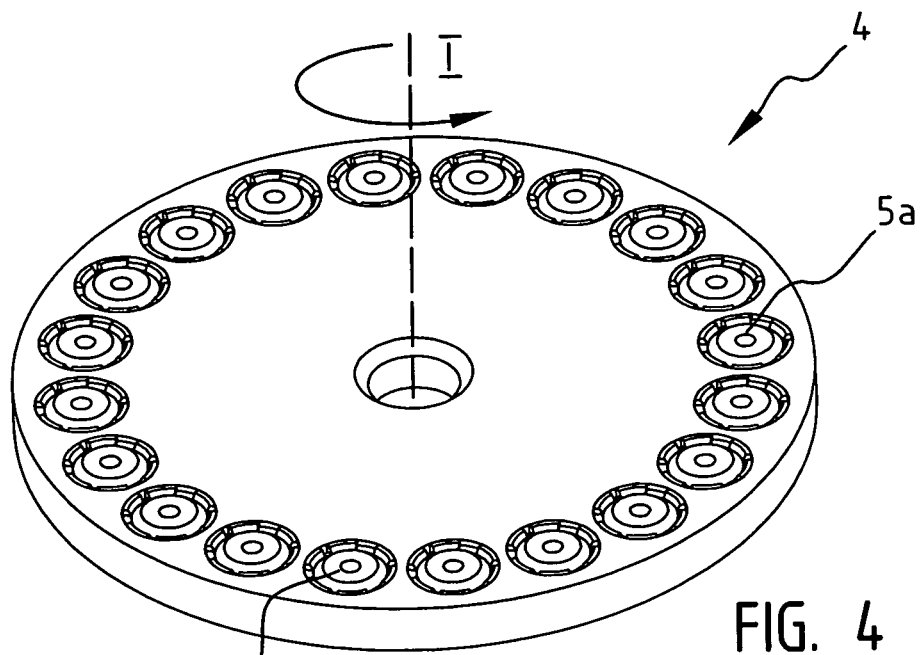
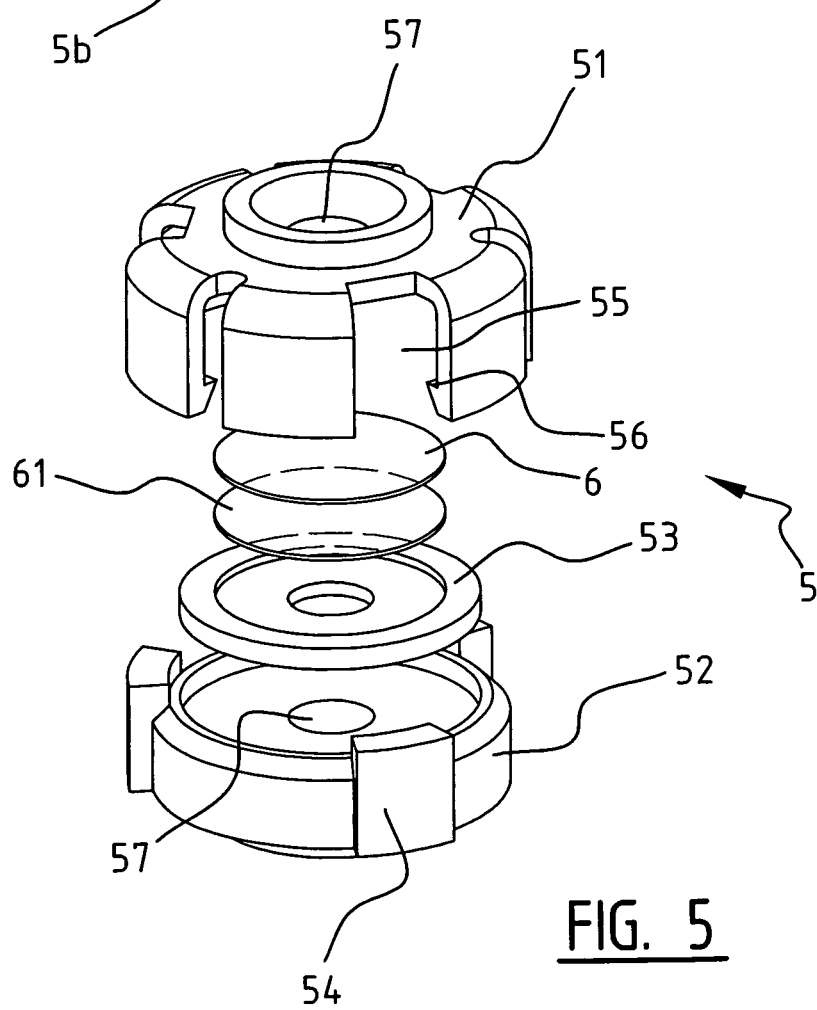

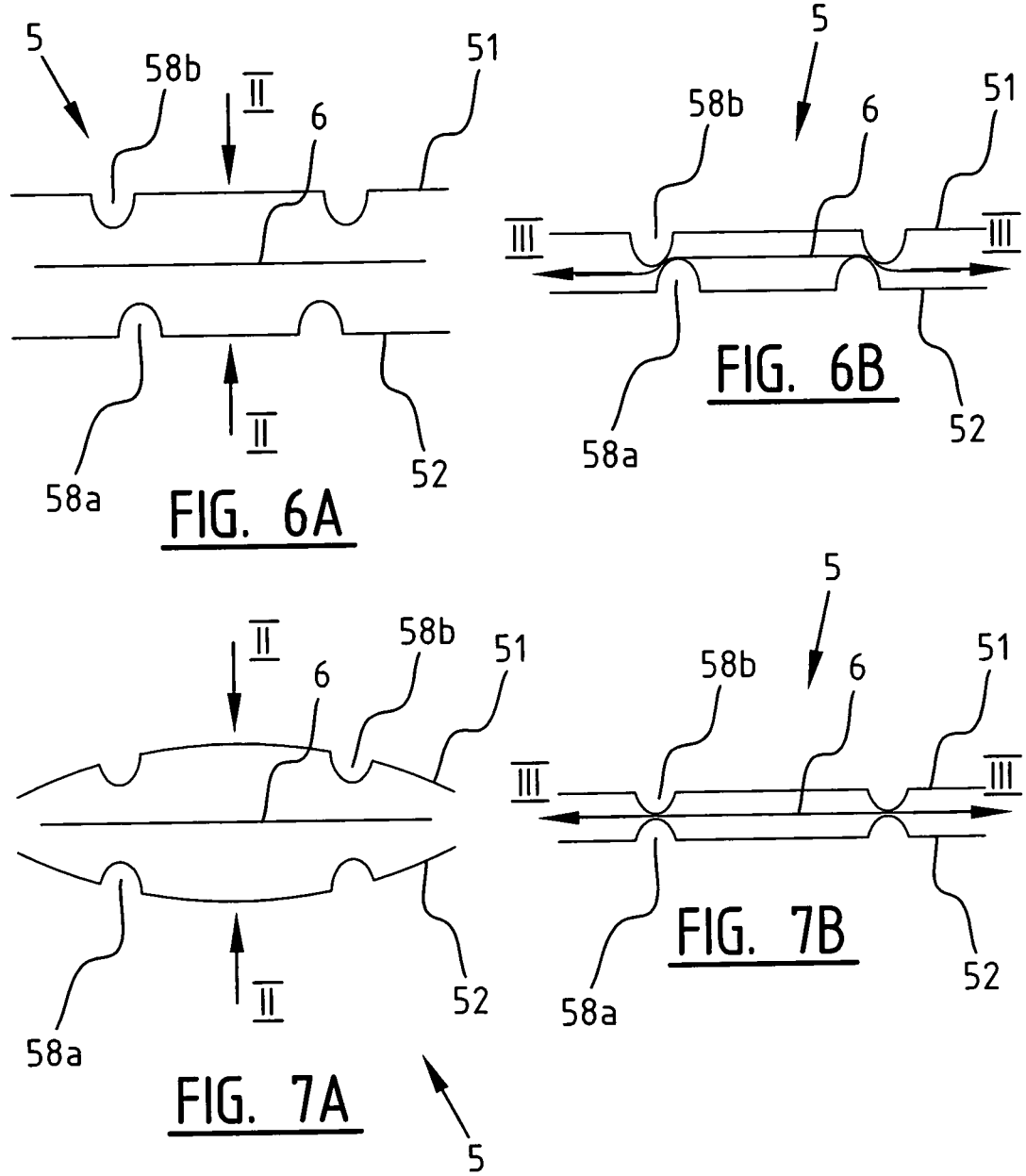

METHOD FOR SIMULTANEOUSLY AND AUTOMATICALLY ANALYZING MICROORGANISMS IN A SAMPLE USING FILTER CYTOMETRY

BACKGROUND

Field of the Technology

The current invention relates to a device and method for automatically analysing micro organisms in an aqueous sample. The invention furthermore relates to a filter and filter holder for use in such a device or method.

Description of the Prior Art

A wide variety of methods for detecting the presence and/or counting the number of micro organisms in liquid samples are known. Most of the known microbiological assays are used for clinical applications and involve a step of pre-incubation of the micro-organisms in order to increase the number of micro organisms to above the detection limit of the assay. This is especially important for clinical microbiological assays where small volume samples comprising low levels of micro organisms are being tested, such as samples of body fluids like blood, cerebrospinal fluid, sputum, urine etc. The main drawback of such assays is that due to the step of pre-incubation these assays require considerable time for carrying out, usually at least 24 to 48 hours, and generally are labor consuming.

Detecting and counting the number of micro-organisms may furthermore also be important in non-clinical settings, such as for instance for monitoring the quality of drinking water, and in the shipping industry, where contaminated ballast water discharges may pose a risk to natural ecosystems around the world, and knowledge about the level and types of micro-organisms present in said ballast water may be very helpful.

Conventional methods of water quality monitoring are not appropriate for the shipping industry because the analysis has to be performed by skilled personnel in specialized laboratories. Moreover, these conventional methods, wherein pre-culturing of the sample is necessary, may take several days to complete. Simpler, more rapid techniques are therefore required.

BRIEF SUMMARY

The object of the present invention is to provide a simple and/or reliable device for automatically analyzing micro organisms in an aqueous sample.

This is achieved by providing a device for automatically analyzing micro organisms in an aqueous sample using filter cytometry comprising at least one filter holder and processing modules, wherein the filter holder is arranged to contain a filter for receiving the sample, wherein the processing modules comprise sample application means for applying the sample to the filter in the holder and imaging means for imaging the micro organisms on the filter, wherein the device further comprises displacement means for automatically moving the filter holder between the processing modules and wherein each of the modules and the filter holder are arranged to removable connect for interaction. The device according to the invention provides an autonomous working device for analyzing micro organisms by providing a movable filter holder which automatically moves along the different modules for filter cytometry. To this end, the device is provided with controlling means for controlling the displacement means and the processing modules. When moved to each of the processing modules, the filter holder connects or docks to the module such that the module can interact with the filter holder. After interaction with said module, the filter holder disconnects and moves on to a next module for further processing.

And since this process can be executed without any manual interaction and since the device according to the invention is provided with all equipment needed for analyzing the aqueous sample, the device according to the invention is particularly suitable for use in remote situations, i.e. non laboratorial environments. In order to function in remote locations, the device according to the invention is preferably provided with power supply means such as batteries.

In the first step of the filter cytometry process, the filter holder is connected to the sample application means and a predetermined volume of the liquid sample is applied on the filter. The liquid will pass through the filter and the micro organisms will be retained on the filter having pores of a size suitable such that the micro organisms will not pass through. Filtration as a means of harvesting micro organisms present in liquid samples is a common known technique in microbiology. Typically, the pore size of a filter for the harvest of bacteria ranges from 0.2-0.6 micrometer. Suitable filter materials that may be used comprise silicon, polycarbonate, and/or glass.

In order to for instance stain the micro organisms retained in the filter, the processing modules preferably comprise dispensing means for applying processing fluids to the sample in the filter holder. After filtration of the sample in the sample application means, the filter holder can be moved to the dispensing means for staining the retained micro organisms using suitable color labels. Labeling the nucleotides inside the cells of the micro-organisms can be achieved by using a fluorescent dye (e.g. SYBR Green, Acridin Orange, propidium iodide, DAPI (4'-6-Diamidino-2-phenylindole). Such fluorescent color labels emit visible light (wavelength depending on the exact chemical nature of the dye) after being radiated by a ultra-violet light source, for instance of a fluorescence microscope. It is furthermore also possible to use fluorescently labeled single strain DNA probes targeted against the 16S or 18S ribosomal RNA of the micro-organisms, using the FISH technology. The principle of this so-called FISH (Fluorescence in situ Hybridization) technology is well known. Other processing fluids may include washing buffers, fixation fluids (e.g. formaldehyde), permeabiiization fluids containing lytic enzymes (e.g. lysozyme, proteinase K) and/or detergents (triton X, Tween etc) and dehydration fluids (e.g. ethanol).

Next, after a short period of incubation if desired, the filter holder can be moved to engage the imaging means. Imaging means in filter cytometry typically include illumination means for lighting the filter with ultraviolet light for detecting the bound labels on the micro organisms. According to a further aspect of the invention, the lighting means comprise at least one ultraviolet Light Emitting Diode (LED), preferably a high capacity LED. Using a LED as light source ensures an instantaneous, generally homogeneous light supply on switch on of the light. After glowing on switch off associated with conventional lighting sources used in filter cytometry is also minimized by using a LED light source.

In a further preferred embodiment the imaging means comprise a microscope for imaging the filter, wherein the microscope is arranged to image substantially the whole surface of the filter and preferably the magnification of the microscope is smaller than 500×, preferably smaller than 100×. Imaging substantially the whole surface of the filter renders the use of XY-scanning techniques redundant, which increases the reliability of the device since XY-scanning tables are known to be sensitive to vibrations.

The use of a high capacity light source, such as the ultraviolet LED as mentioned above, for lighting the filter surface ensures that sufficient light is reflected for detection using this relative small magnification.

It will be appreciated that the use of a high capacity LED light source in combination with a relative small magnification, for instance 100×, provides a reliable and simple imaging system without the drawbacks of conventional lighting systems, such as mechanically moving diaphragms for interrupting the light beam and the environment sensitive XY-scanning techniques. It should further be noted that the imaging means according to the invention can also be used in other analyzing devices, for instance in non autonomous devices.

For image acquisition, the device is preferably provided with a digital image acquisition device and more preferably the microscope is provided with an integral acquisition device. Typically, such an image acquisition device comprises a CCD-device.

The image obtained by the imaging means can then be analyzed using analyzing means provided in the device according to the invention, which will be explained more in detail below.

In a further preferred embodiment of the device according to the invention, the device is provided with wireless communication means such as Wireless LAN or GPRS for connecting to the device from a remote location.

In a further preferred embodiment the displacement means are arranged to move a plurality of filter holders between the processing modules. This allows autonomous analyses of different sample fluids or analyses of the same sample fluid over a longer period of time since a plurality of filters is provided, wherein each of the filters can be moved to the respective processing module. And preferably the processing modules and the displacement means are arranged to connect a plurality of filter holders to respective processing modules simultaneously. This allows a more time efficient process. For instance, when a first filter contained in its filter holder is supplied with a sample fluid by the sample application means and is moved to a next module, for instance to the dispensing means for labeling the micro organisms, the sample application means can supply a second filter with the fluid sample simultaneously to the dispensing of dyes by the dispensing means to the first filter.

In a further preferred embodiment of the invention, the displacement means comprise a disc shaped member arranged to hold at least one filter holder and wherein the disc shape member is arranged to rotate to move the filter holder between the processing modules and preferably the disc shaped member is arranged to hold a plurality of filter holders. By rotating a disc shaped member for holding the filter holders, reliable displacement means are provided. It is advantageous when the disc shaped member is arranged to hold each of the filter holders at substantially equal distances from the rotating axis of the rotating member, i.e. at a substantially equal radial location with respect to the rotation axis of the disc. And even more preferably, the processinq modules extend in a substantially circular segment for removable connecting to the moving filter holder. Using this assembly, the different modules extend in close proximity of the filter holders in de disc shaped member, allowing a reliable connection between the respective modules and the filter holders. Rotation of the disc will then result in the movement of each of the held filter holders in the disc to move to next location in the device, preferably to a next processing module.

In a further preferred embodiment the filter holder is moveable between a first state wherein the filter is substantially relaxed and a second state wherein the filter is tensicned. Preferably, the filter holder moves from the first state to the second state by removable connecting or docking to a processing module. Tensioning or pulling tight the filter enhances the processing at the processing modules, for instance when applying dyes or imaging the filter.

In a further preferred embodiment the filter holder comprises two engaging ring shaped members, wherein the filter is disposed between the ring shaped members. A filter can then be easily placed on a ring shaped member and the filter holder is ready for use after the connection of the second ring shaped member. Preferably, the ring shaped members are arranged to provide a snap fit when connected.

Preferably, the ring shaped members comprise engaging ribs for engaging the filter there between, wherein the ribs extend in circle segments in the ring shaped members and wherein the engaging ribs move axially outwardly when moving from the first to the second state, tensioning the filter. The filter disposed between the ring shaped members is hereby engaged by the engaging ribs, whereby the rib of a single ring shaped member engages the filter at at least two axially opposite locations, allowing tensioning of said filter. More preferably, the ribs are circular. Preferably, the ribs of the different ring shaped members engage the filter on opposite sides of said filter, clamping the filter between the engaging ribs. When moving from the first to the second state, the ribs move axially outwardly, tensioning the filter.

Preferably, the ring shaped members are manufactured from a resilient material, allowing bending of the ring shaped members. It is advantageously when the ring shaped members have a curved shape in cross section in the first state and wherein by applying force in the axial direction on the ring shaped members, said members deform to a less curved cross sectional shape, axially moving the ribs. Preferably the ring shaped member forming the filter holder deform when removable connecting or decking to the processing modules.

In a further preferred embodiment the filter is manufactured from polycarbonate. And preferably the filter has a pore size of approximately 0.4 μm. Such filters show good results when used for instance in vacuum filtration devices and are widely available. In order to be able to use a polycarbonate filter in non-vacuum devices, the filter is provided with a gauze, preferably in the form of a coating. The gauze provides rigidity to the filter, allowing a substantially planar surface when being imaged, e.g. when tensioned or pulled tight as mentioned above. The gauze supports the relative flexible filter.

Preferably the gauze is manufactured from aluminum. Aluminum is liqht weiqhted and provides good support and rigidity to the filter. Preferably the wire thickness of the gauze is between 5 and 20 μm, and more preferably approximately 10 μm. And preferably the wire distance of the gauze is between 20 and 100 μm, and more preferably approximately 40 μm.

It should be noted that the above described filter assembly and/or filter holder is also useable in other filtering devices, for in instance non autonomous filtering devices.

The invention further relates to a method for automatically analyzing micro organisms in an aqueous sample using filter cytometry, comprising the steps of:

a) applying a predetermined volume of the sample on a filter;
b) staining the micro organisms on the filter with one or more labels;
c) imaging the bound labels on the filter surface, and;
d) analyzing the filter image for quantification of the micro organisms on the filter,
wherein the step of analyzing comprises determining the optimal threshold for separating the micro organisms from the background in the filter image, wherein determining the optimal threshold comprises:
  i. thresholding the filter image using a range of thresholds;
  ii. determining the ratios of selected and unselected objects for the range of thresholded images, wherein an object with a size larger than a predetermined lower threshold is selected, and;
  iii. designating a threshold from the range of thresholds resulting in the highest ratio as the optimal threshold.

Imaging membrane filtrations usually results in images with a wide variety in overall brightness, i.e. the background of the image can vary between grey and black. The brightness of the objects, i.e. the micro organisms, in the image also varies, for instance between white and grey colors. It can therefore be possible that grey objects are imaged before a grey background with only a slight difference in grey value. By designating the threshold which shows an optimal ratio between selected and unselected objects, the method is independent of the difference in grey values between the objects and the background, minimizing the chance of missing an object. Preferably, the thresholding in step i comprises applying a range of thresholds with an increasing grey value, for instance from 0 (black) to 1 (white).

Preferably, the lower threshold is between 0.1 $\mu m^2$ and 1 $\mu m^2$, more preferably between 0.35 $\mu m^2$ and 0.75 $\mu m^2$ and even more preferably the lower threshold is approximately 0.5 $\mu m^2$.

In a preferred embodiment, in step ii an object with a size larger than an upper threshold is considered as one selected object. In this way, micro colonies of a single micro organism are treated as one micro organism instead of being excluded from the analysis. Preferably, the upper threshold is between 2 $\mu m^2$ and 8 $\mu m^2$, more preferably between 4 $\mu m^2$ and 6 $\mu m^2$. Even more preferably, the upper threshold is approximately 5 $\mu m^2$.

In a further preferred embodiment the ratios of selected and unselected objects is normalized to the total number of objects in the filter image.

In a further preferred embodiment imaqinq the filter surface comprises imaging substantially the whole filter surface, which renders the use of XY-scanning techniques obsolete. Preferably the surface is illuminated with a high capacity UV-light, more preferably a high capacity ultra violet LED as described earlier.

In a further preferred embodiment steps (a)-(d) are repeated if less than a predetermined number of micro organisms is counted in step (d), wherein an increased sample volume is applied to the filter in step (a). Preferably the sample volume is increased substantially tenfold. And even more preferably, the sample is determined as negative if steps (a)-(d) are repeated at least twice and less than the predetermined number of micro organisms is counted in step (d). This allows a reliable quantification of the micro organisms in an aqueous sample using a single filter, even when the concentration of the micro organisms can not be estimated a priori.

When for instance less than 10 events, i.e. micro organisms, are counted in step (d) of the method according to the invention, it is assumed that the micro organism concentration in the sample is to low to achieve a reliable quantification using the initial sample volume, for instance 1 ml. Next, an increased sample volume, for instance 9 ml, is applied to the same filter and the process is repeated. When more than for instance 10 events are counted in the sample in the second quantification process, the sample can be analyzed in more detail. If still less than the predetermined number of micro organisms is counted, the sample volume can be increased to 90 ml. When still less than the predetermined number of micro organisms is detected, the sample is assumed to be negative.

In a further preferred embodiment, at least two of the steps (a)-(c) are executed at separate locations in a device for automatic filter cytometry, wherein the filter is automatically moved between said locations and wherein said steps can be executed simultaneously on at least two separate filters. This results in an efficient process since multiple filters can be processed at the same time.

It will be appreciated that this method for quantifying micro organisms in a fluid sample is particularly efficient when used in the device according to the invention, since the ability to move the filter between the various processing modules allows the same filter to be used for the whole quantification process. It should further be noted that the above described quantification method is also applicable with other thresholding techniques as the one described above.

The invention furthermore relates to a filter for use in filter cytometry fabricated from polycarbonate, wherein the filter is provided with a gauze, preferably a aluminum gauze. More preferably, the filter is coated with said gauze.

The invention furthermore relates to a filter holder for holding a filter for use in filter cytometry, wherein the filter holder is moveable between a first position wherein the filter is substantially relaxed and a second position wherein the filter is tensioned.

BRIEF DESCRIPTION OF THE DRAWINGS

The present invention is further illustrated by the following Figures, which show a preferred embodiment of the device according to the invention, and are not intended to limit the scope of the invention in any way, wherein:
FIG. 4 schematically shows the filter disc according to the invention;
FIG. 5 schematically shows the filter holder according to the invention, and;
FIGS. 6A, 6B and 7A, 7B schematically show embodiments of the mechanism for tensioning the filter.

DETAILED DESCRIPTION OF THE PREFERRED EMBODIMENTS

Figure 1:
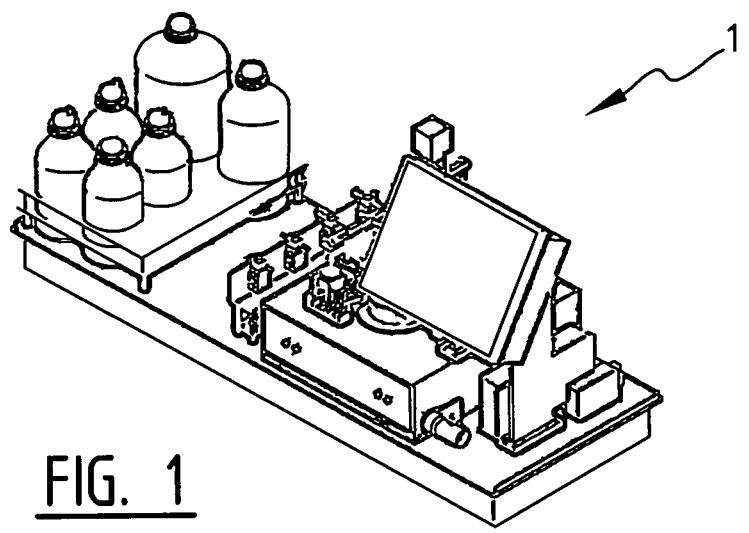
FIG. 1 schematically shows a device according to the invention in perspective.
Figure 2:
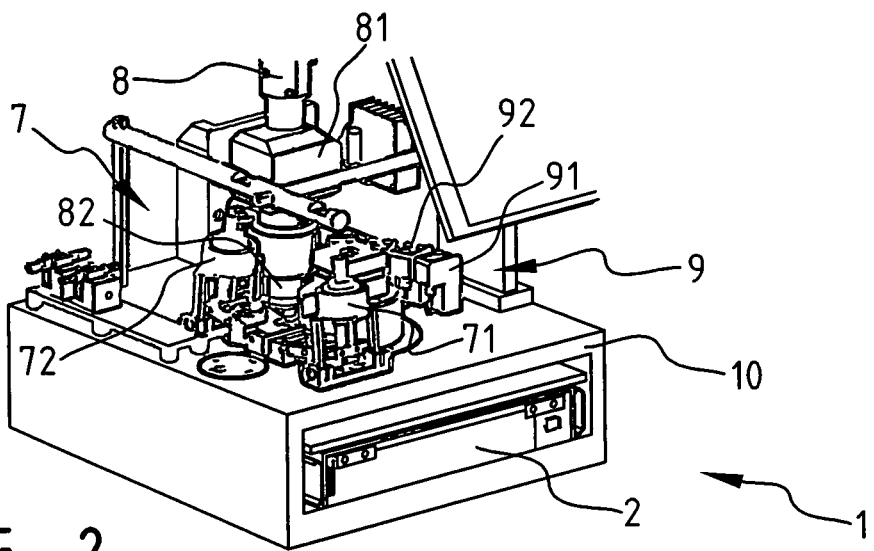
FIG. 2 is close up view of the device from FIG. 1.
Figure 3:
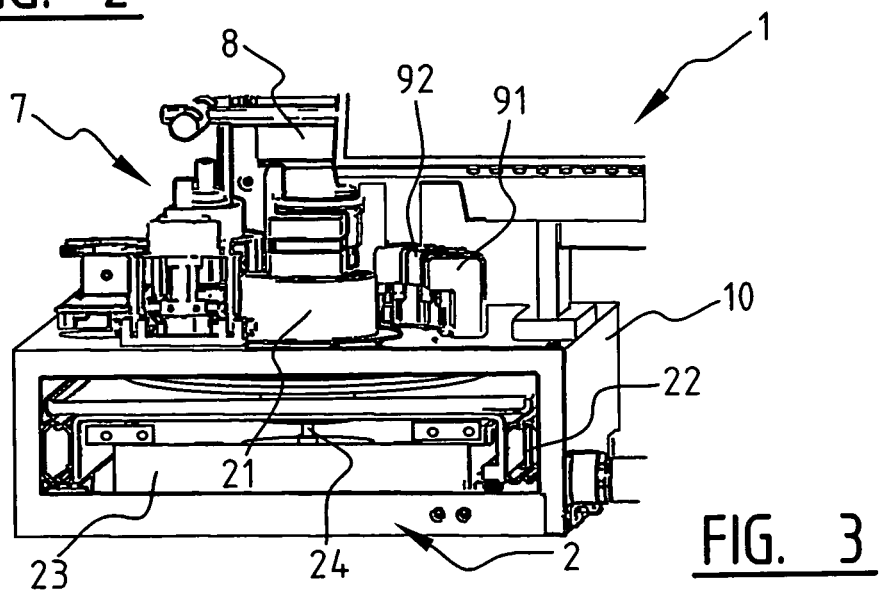
FIG. 3 is a side view of the device from FIGS. 1 and 2.

In FIGS. 1, 2 and 3, a device for automatically analyzing micro organisms in an aqueous sample according to the invention is shown in the form of a filter cytometer 1. The cytometer 1 is provided with a housing 10 for holding the various components of the device. The device 1 is arranged to autonomously analyze sample fluids without manual interaction. The device is therefore provided with processing modules in the form of sample application means 7, dispensing means 9 and imaging means 8 and the device is further provided with displacement means 2 for moving the filter holders 5, as shown in FIG. 5, between the various processing means. The cytometer 1 comprises control means for controlling the displacement means 2 and the processing modules. The device 1 according to the invention is furthermore provided with remote access means in the form of wireless communication.

The sample application means 7 are shown in the form of sample feeders 71 and 72 which can contain different sample fluids to be analyzed. The sample feeders 71, 72 are arranged to insert a predetermined volume of sample fluid in the filter holders 5, as shown in FIG. 5, when said filter holders extend below said feeders as will be explained more in detail below. The dispensing means 9 are shown in the form of dispensers 91, 92 which contain labeling and washing fluids for supply to the filter holders 5. The imaging means 7 comprise a microscope 82 with a 100× magnification. The microscope 82 is arranged to project the whole surface of a filter contained in the filter holder 5 on a CCD-device 81 for obtaining a digital image of substantially the whole filter surface.

The displacement means 2 are shown in FIG. 4 in the form of a filter disc 4 for holding twenty filter holders 5. The filter disc 4 can be placed in a drawer 23, visible in FIG. 3. The drawer 23 can be moved outside the housing 10 using slides 22 for easy placement of the disc 4. The displacement means 2 furthermore comprise a motor 21 for driving an axis 24 which rotates the disc 4 around axis I as is indicated in FIG. 4. By rotation of the disc around axis I, each of the filter holders 5, for instance 5*a* and 5*b*, can be placed underneath each of the processing means for interaction therewith.

The filter holder 5 according to the invention is shown in exploded view in FIG. 5. Filter holder 5 comprises two ring shaped member 51, 52 which engage each other upon connection. The upper member 51 is provided with a protruding rim 56 for snapping on the bottom member 52. The members 51, 52 are manufactured from a resilient material, facilitating the snapping connection. The snapping connection limits any unwanted relative movement of the members in the axial direction. The ring member 51, 52 are further provided with cooperating protrusions 54 and openings 55 limiting any relative rotation between the ring shaped members 51, 52 when connected.

Disposed between the ring shaped members 51, 52 is the filter 6. Filter 6 is manufactured from polycarbonate and has a pore size of 0.4 µm. To increase the rigidity of the filter 6, filter 6 is provided with a coating of aluminum gauze 61. Aluminum gauze 61 has a wire thickness of 10 µm and the wires are spaced at a distance of 40 µm. For proper placement of the filter assembly 6 in the holder 5, a retainer 53 is provided. The filter holder 5 is provided with openings 57 allowing the supply of sample fluid, processing fluids or imaging of the filter 6.

In FIGS. 6A and 7A, two embodiments of the filter holder 5 are shown in cross section in a first state wherein the filter 6 is substantially relaxed. For holding the filter 6, the upper ring shaped member 51 of the filter holder 5 is provided with an upper rim 58*b* and the lower ring shaped member 52 comprises a lower rim 58*a*. Rims 58*a*, 58*b* extend in circle segments, preferably circularly in the ring shaped members 51, 52. The rims 58*a* and 58*b* are arranged to engage the filter 6 on opposite sides thereof. Although the filter 6 in FIGS. 6A and 7A is not engaged by the rims 58*a*, 58*b*, in other embodiments it is possible that the rims 58*a* and 58*b* engage the filter surface 6 in the first state.

The filter holder 5 is arranged to move from the first state as shown in FIGS. 6A and 7A to a second state wherein the filter 6 is tensioned, as shown in FIGS. 6B and 7B. By tensioning the filter 6 it is possible to use a relative flexible filter 6 made of polycarbonate. By providing the filter 6 with aluminum gauze 61, as shown in FIG. 5, it is possible to tension said filter without damaging the polycarbonate filter.

In the embodiment of FIGS. 6A and 6B, the rims 58*a* and 58*b* have different diameters, such that the rims 58*a* and 58*b* engage the filter 6 on different radial locations. When the filter holder 5 is subjected to a pressing force II, the rims 58*a* and 58*b* engage the filter 6, pulling the filter 6 tight in the direction indicated with III.

In the preferred embodiment of FIGS. 7A and 7B, the ring shaped member 51, 52 are manufactured from a resilient material. In the first state as indicated in FIG. 7A, the ring shape members 51, 52 show a curved cross sectional shape. The rims 58*a* and 58*b* extend above each other. By pressing the members 51 and 52 in a direction indicated with II, the member 51, 52 will deform and the rims 58*a* and 58*b* will move in a direction indicated with III, tensioning the filter 6 which is engaged by said rims. In this embodiment, the rims 58*a* and 58*b* are arranged to clamp the filter 6 there between, aliowinq a tensioning movement III when the filter holder 5 is compressed in a direction II.

The pressing action II can for instance be the result of the snapping action of the ring shaped members 51 and 52 upon connection or the docking of the filter holder 5 to a processing module for interaction therewith.

Although in the examples shown in FIGS. 6 and 7 the ring shaped members 51 and 52 are provided with the rims 58*a*, 58*b*, it is also possible to for instance provide the retainer 53 with the lower rim 58*a*. A pressing action of the upper ring shaped member 51 can then result in the tensioning action indicated with III in FIGS. 6B and 7B.

The invention claimed is:

1. A method for simultaneously and automatically quantifying a number of microorganisms in an aqueous sample of a plurality of aqueous samples using filter cytometry, comprising the steps of:
   a) applying a predetermined volume of a sample of the plurality of samples on a first filter at a first location;
   b) moving the first filter from the first location to a second location;
   c) applying processing fluids for staining the microorganisms on the first filter with one or more labels at the second location;
   d) moving the first filter from the second location to a third location;
   e) imaging the bound labels on a surface of the first filter at the third location;
   f) quantifying the number of microorganisms on the first filter; and
   g) automatically moving the first filter between the first location and the second location and between the second location and the third location at the conclusion of each of the steps a) and c), respectively, in a device comprising a displacement means arranged to move a plurality of filter holders between each processing modules for automatic filter cytometry,
   wherein automatically moving the first filter between the first location to the second location comprises simultaneously moving a second filter to the first location, and
   wherein at least steps a) and c) are performed simultaneously on each of the second filter and the first filter, respectively.

2. The method according to claim 1, wherein the steps e) or f) is executed on a third filter simultaneously as steps a) and c) are performed simultaneously on each of the second filter and the first filter, respectively.

3. The method according to claim 1, wherein the step of quantifying the number of microorganisms comprises determining the optimal threshold for separating the microorganisms from the background in the filter image, wherein determining the optimal threshold comprises:
thresholding the filter image using a range of thresholds;
determining the ratios of selected objects, a selected object being an object with a size larger than a predetermined lower threshold, and determining the ratios of unselected objects for the range of grey value threshold images; and
designating a grey value threshold from the range of grey value thresholds resulting in the optimal ratio as the optimal grey value threshold.

4. The method according to claim 3, wherein the optimal ratio is the highest ratio.

5. The method according to claim 3, wherein determining the ratios of selected objects comprises determining an object with a size larger than an upper threshold as one selected object.

6. The method according to claim 3, wherein the ratios of selected and unselected objects is normalized to the total number of objects in the filter image.

7. The method according to claim 5, wherein the lower threshold is between 0.1 $\mu m^2$ and 1 $\mu m^2$ and wherein the upper threshold is between 2 $\mu m^2$ and 8 $\mu m^2$.

8. The method according to claim 1, wherein imaging the bound labels on the filter surface comprises imaging substantially the whole filter surface.

9. The method according to claim 1, wherein steps a), c), e), and f) are repeated if less than a predetermined number of microorganisms is counted in step f), wherein an increased sample volume is applied to the filter in step a), and wherein the sample volume is increased substantially tenfold.

10. The method according to claim 9, wherein the sample is determined as negative if steps a), c), e), and f) are repeated at least twice and less than the predetermined number of microorganisms is counted in step f).

* * * * *